United States Patent Office 3,180,107
Patented Apr. 27, 1965

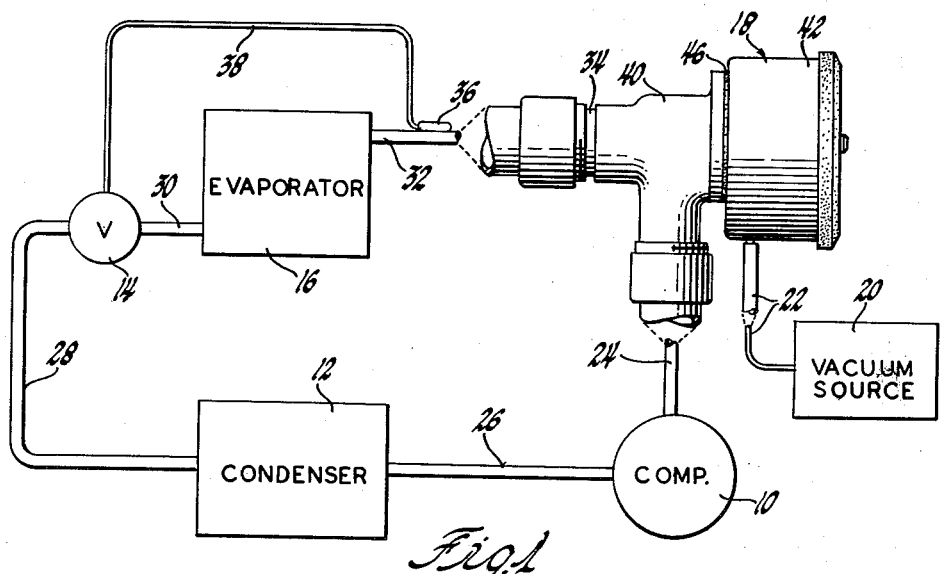
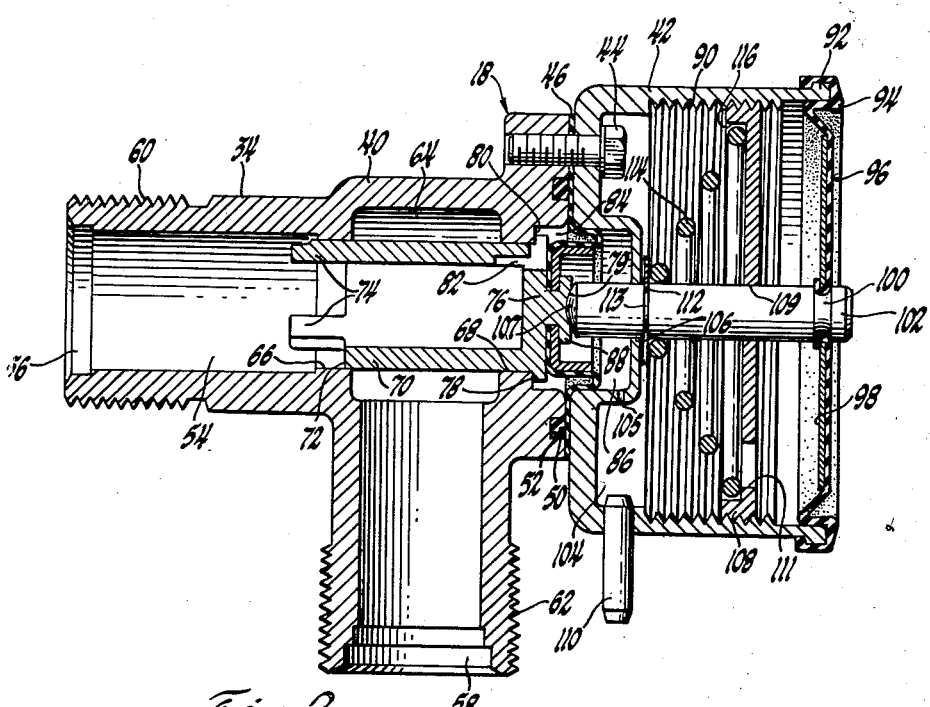

3,180,107
REFRIGERATION SYSTEM AND VALVE
ASSEMBLY
Marshall W. Baker, Lockport, and Lynn E. Waite, Gasport, N.Y., assignors to General Motors Corporation, Detroit, Mich., a corporation of Delaware
Filed Oct. 4, 1962, Ser. No. 228,464
8 Claims. (Cl. 62—209)

This invention relates to a refrigeration system and valve assembly and more particularly to a refrigeration system employing a compressor, a condenser and an evaporator and to a valve assembly for controlling the flow of refrigerant in such a system, the valve assembly being specially adapted for use in automobile air conditioning systems because of the variations in conditions encountered in that field requiring close control.

One form of automobile refrigeration system is disclosed in U.S. Patent 2,780,076, granted February 5, 1957, in the name of Robert F. McLean. This system employs a conventional expansion valve by means of which the rate of flow of refrigerant under high pressure from a compressor and condenser is controlled as it enters a low pressure portion of the system represented by an evaporator and a return line leading to the compressor thereby acquiring the cooling effect in the evaporator. Such expansion valves are thermostatically controlled by evaporator discharge temperature and evaporator inlet pressure in a manner such as taught, by way of example, in the U.S. Patent 2,787,888, granted April 9, 1957, in the names of Holmes, Zwicker and Mandy.

It is desirable to maintain a predetermined minimum pressure in the evaporator at all times since moisture will collect and freeze on the outside of the evaporator, particularly under high humidity conditions, if the evaporator pressure becomes too low. Also, during normal operation, the pressure of the refrigerant in the evaporator should be kept constant so that the cooling effect will closely conform with the results desired.

A convenient manner of regulating the cooling effect despite variations in conditions encountered is by using a vacuum operated throttling valve controlling pressure to supplement the flow rate control action of the expansion valve. Varying the degree of vacuum as produced by the engine intake manifold of a car permits a convenient and accurate control of a throttling valve as installed in the refrigerant circuit between the evaporator and compressor and, hence, the cooling effect. There are several ways in which the degree of vacuum may be changed thermostatically and in accordance with the variation in a condition such as passenger compartment temperature. One suitable arrangement is disclosed in the U.S. application for Letters Patent S.N. 106,952, filed May 1, 1961, in the same of Norman R. Hagler and entitled "Solenoid Operated Vacuum Regulator." This application was issued January 15, 1963, as Patent No. 3,073,345. The present invention is not concerned with the manner of obtaining an extent of vacuum in accordance with a condition but is concerned with a refrigeration system and control valve regulatable by a vacuum, the extent of which is suitably controlled in a way such as heretofore developed.

An object of the present invention is to provide an improved refrigeration system in which the flow of refrigerant may be conveniently and precisely controlled according to a basic predetermined setting for normal operation of the system and in such a way as to eliminate freeze-up of an evaporator under certain conditions and to maintain a required evaporator load during normal operation. Another object is to provide an improved valve assembly for use in a refrigeration system to maintain an evaporator pressure simultaneous with the use of an expansion valve controlling the refrigerant flow rate.

A feature of the present invention is a refrigation system using a refrigerant or circulating first fluid and a throttling valve assembly operated by the extent of pressure of a second fluid in controlling the pressure of the first fluid with at least a predetermined minimum pressure of the first fluid being assured to prevent evaporator freeze-up. Another feature is an improved throttling valve assembly adapted to cooperate with an expansion valve to control the flow of a first fluid such as a refrigerant in accordance with a basic setting and which is capable of modulated adjustment under the influence of a second fluid as supplemented by the effect of resilient means such as a spring to obtain a desired cooling effect.

These and other important features of the invention will now be described in detail in the specification and then pointed out more particularly in the appended claims.

In the drawings:

FIGURE 1 is a diagrammatic view of a refrigeration system constituting one embodiment of the present invention; and FIGURE 2 is an enlarged sectional view of a control valve or throttling valve shown in the system of FIGURE 1.

Although the showing in FIGURE 1 is highly diagrammatical in form, it will be understood that additional controls may be added to suit the situation. Such a control could be, for example, an equalizing line connected around the evaporator as is well known in the refrigeration field. Insofar as it is necessary for presenting an understandable and adequate disclosure of the present invention, it may be stated that the general circulation of the refrigerant is through a conventional series arrangement of a compressor 10, a condenser 12, an expansion valve 14 and an evaporator 16. A special control valve assembly 18 forming a part of the present invention is installed between the evaporator and the compressor. This control valve assembly may be regulated from a source of vacuum diagrammatically illustrated at 20 and connected to the valve assembly 18 by a line 22. The discharge from the valve assembly 18 to the compressor 10 is by way of a line 24. A line 26 connects the compressor to the condenser 12 and a line 28 connects the latter to the expansion valve 14. The latter is conventionally located close to the evaporator 16 and is connected thereto by a short line 30. A line 32 serves as a conduit for refrigerant flowing at low or evaporator pressure to the inlet end 34 of the control valve assembly 18. The expnasion valve 14 is conventionally controlled by means of a thermosensitive bulb 36 which is connected to the valve 14 by a line 38 as shown in the U.S. Patent 2,787,888 heretofore referred to.

The vacuum source 20 is such that it may be adjusted manually or automatically to suit conditions, i.e. to gain an effect modulated in accordance with the extent of vacuum as taught in the U.S. Patent No. 3,073,345.

The control valve assembly 18 may be termed a suction modulating throttling valve and this valve, because of its simplicity, may be small and compact as related to other components of the system. It comprises a housing of two parts 40 and 42 bolted together with bolts such as a bolt 44 with a sealing and herein termed "small" diaphragm 46 interposed. The sealing effect of the small diaphragm between the two parts of the housing is supplemented by the action of an O-ring 50 retained within an annular recess 52 in the part 40.

The part 40 defines a right angle flow passage 54 leading from the inlet end 56 and an outlet at 58 and is provided with suitable threads 60 and 62 for connecting the lines 32 and 24 respectively. The right angle flow passage 54 also includes a valve chamber 64 which is located control valve assembly or suction modulatable throttling downstream from a valve seat 66 coaxial with the inlet 56. At the other side of the valve chamber 64 is an annular bore 68 of the same diameter as the valve seat 66 so that a pronged cylindrical valve member 70 may slide axially in the bore and seat. The valve member 70 has an annular arrangement of cut-off shoulders 72 which are separated by prongs 74 serving to guide and retain the valve when the latter is in open position. The valve member 70 is hollow from its pronged end to a closed end 76 and this end bears an annular shoulder 78 adapted to contact a shoulder 80 on the part 40 when the valve assembly is closed as seen in FIGURE 2 and also a recess 79 for centering a plunger 102. A small passage 82 is formed in the valve member 70 giving continual communication between the inlet 56 of the valve housing and a small chamber 84 formed in the valve portion 40 and coaxial with the inlet 56 and the valve member 70. The portion 42 of the housing is formed with a small recess 86 and in the assembly this recess is arranged in coaxial relation with the small chamber 84 in such a way that a rolling central or reversely cupped portion of the diaphragm 46 may move in the two chambers 84 and 86 as shown clearly in FIGURE 2. The central portion of the diaphragm 46 is retained firmly on the closed end 76 of the valve member 70 by means of a head 88 formed on the valve.

The portion 42 of the housing is in the general form of a cup with internal threads 90 and a thickened annular lip as at 92. This lip serves in the retention of the peripheral margin of a flexible large diaphragm 94 which is exposed on one side 96 to the atmosphere. A reinforcing plate 98 is retained adjacent to the diaphragm 96 by means of a groove 100 formed on the plunger 102. The plunger extends through the portion 42 and through a vacuum chamber 104 defined in that portion and is in free sliding relationship with a port 106 formed in the wall of the recess 86. The inner end of the plunger 102 is rounded as at 107 and is seated in the recess 79. A nipple 110 is fixed in the wall of the portion 42 whereby a vacuum may be introduced by the line 22 to the two chambers 104 and 86 which actually constitutes one operative vacuum chamber because of a small passage 105. The three chambers 104, 86 and 84 actually constitute an operative control chamber divided by the small diaphragm 46.

A disk 108 is held by the threads 90 within the portion 42 and this disk bears an opening 109 through which the plunger 102 may slide. An intermediate portion of the plunger 102 bears an annular recess 113 in which a small annular disk 112 is retained and upon which a small end of a conical spiral spring 114 bears. The disk 112 is suitably apertured so that chambers 86 and 104 communicate at all times and the aperture 111 in disk 108 equalizes the pressures on opposite sides of the latter. The large diameter end of the spring 114 is held in a recess 116 of the disk 108.

It will be seen from the structure disclosed in FIGURE 2 that in effect the diaphragm 46 is relatively small in its effective area for moving the valve when compared with the effective area of the so-called large diaphragm 94. It is also clear from the showing of FIGURE 2 that the force of atmospheric pressure against the large diaphragm 94 together with the loading of the spring 114 will tend to close the valve member 70. It is also clear that pressure of the refrigerant in the evaporator 16 is the same as in the inlet 56 and the chamber 84 and will tend to open the valve. Changing of the extent of vacuum in the communicating chambers 104 and 86 will determine the position of the valve in the establishing of a balance of the forces set up against the valve member and thereby change the evaporator pressure. Adjustment of the loading of the conical spiral spring 114 by rotating the disk 108 may easily be undertaken.

Assuming that no vacuum is applied to the chamber 104, the diaphragm 94 will have no effect on the plunger 102. The spring 114 will have expanded its maximum amount as determined by seating of the valve head at 78. The valve member 70 will be closed as shown in FIGURE 2 when not in operation and, assuming that the system is in operation, the evaporator pressure will not fall below a predetermined amount. The system will always start with an evaporator pressure higher than the control valve setting, and as the evaporator pressure is lowered, the valve moves from a wide open position to a throttling position as the control pressure is approached. In the event less cooling is required, the vacuum in the chambers 104 and 86 will be increased by an arrangement such as disclosed in Patent No. 3,073,345 which will result in a tendency to close the valve member 70. This is because the degree of vacuum has more effect on the large diaphragm 94 than it has on the small diaphragm 46. Closing of the valve member 70 increases the evaporator pressure and thereby raises its temperature so that less cooling obtains. If more cooling is required, the vacuum is decreased and the valve member 70 will tend to open. This reduces the evaporator pressure and lowers the temperature of the evaporator and the air passing through the evaporator core to the zone which the system is adapted to serve. At a given setting of the extent of vacuum, an equilibrium of forces exerted against the valve will be set up to maintain the evaporator pressure constant and the system is adapted to serve all temperature zones between maximum modulation and the freezing point.

We claim:

1. A refrigeration system comprising an evaporator, a control valve assembly including a valve member, a compressor, a condenser and an expansion valve connected in series in a circuit for circulating a refrigerant fluid, means responsive to pressure in said evaporator urging said control valve member to an open position, resilient means arranged in a chamber of said control valve assembly to urge said control valve member to a closed position, a source of a second fluid under pressure modulation, a line connecting said source to said chamber means operable by said second fluid arranged to increase the closing force of said resilient means and including a movable element connected to said valve member and subjected to a differential pressure independent of said evaporator pressure.

2. A suction modulatable throttling valve assembly including a housing defining a valve chamber and a control chamber, an inlet and an outlet leading to said valve chamber, a valve seat between said inlet and valve chamber, an inner small diaphragm dividing said control chamber into a small chamber and a large vacuum chamber, an opening in said valve assembly extending from said inlet to said small chamber, a valve member arranged in registry with said valve seat and slidable in and substantially closing said inlet, a central portion of said inner small diaphragm being fixed to one end of said valve member to move therewith, said assembly having a bleed port connecting said inlet to said small chamber, an outer large diaphragm partially defining said large vacuum chamber, a rod connected to said outer diaphragm to move therewith and extending toward said valve member, mechanical means arranged resiliently to urge said rod and valve member into contact and toward positions at which connection between said inlet and outlet is cut off by said valve member at said seat, and means for supplying vacuum to said large vacuum chamber.

3. A valve assembly including a housing defining a right angle flow passage with an inlet and an outlet, a control chamber in said housing and coaxial with said inlet, a small diaphragm separating said control chamber into a small inner chamber and a large outer vacuum chamber, a conical spiral spring in said large vacuum chamber, a plunger acted upon by said spring, a large diaphragm exposed to the atmosphere and fixed to said plunger, a valve member slidable in said flow passage and having one end fixed to said small diaphragm and movable therewith, a small passage in said assembly connecting said inlet to said small inner chamber, means for supplying a vacuum to said large outer vacuum chamber to affect said diaphragms, and the arrangement being such that an increase in vacuum in said large outer vacuum chamber tends to move said valve member into position closing said inlet.

4. A valve assembly as set forth in claim 3 in which said small passage is in said one end of said valve member.

5. A valve assembly as set forth in claim 3 in which said small diaphragm and said one end of said valve member are actuatable by pressure of one fluid in said flow passage and a second fluid acting between said diaphragms and outside said large diaphragm.

6. A valve assembly as set forth in claim 3 including a support member mounted in said control chamber, the large diameter end of said conical spiral spring being retailed in position by said support member, and means whereby said support member may be adjusted to vary the loading of said spring.

7. A refrigeration system comprising an evaporator, a control valve assembly having a movable valve member, a compressor, a condenser and an expansion valve connected in series in a circuit for circulating refrigerant, means responsive to evaporator pressure urging said control valve member to an open position, said control assembly having a housing defining a valve chamber and a control chamber, said valve member being in said valve chamber to control flow in said circuit, said control chamber being substantially defined between one end of said valve member and a large diaphragm and divided into a large vacuum chamber and a small inner chamber by a small diaphragm, said large diaphragm being exposed to the atmosphere, said small diaphragm being fixed to said valve member and responsive to evaporator pressure urging said valve member open, resilient means in said large vacuum chamber urging said valve member closed, means fixed to said large diaphragm to move therewith and arranged to cooperate with said resilient means in closing said valve member, and a line leading to said large vacuum chamber for introducing a vacuum to modulate the refrigerant throttling action of said valve member.

8. A refrigeration system such as set forth in claim 7, said resilient means being spring means, and means for adjusting the loading of said spring means to predetermine the evaporator pressure.

References Cited by the Examiner

UNITED STATES PATENTS 2,097,539 11/37 Tomlinson _____ 62—217
2,108,234 2/38 Raymond _____ 251—61
2,966,044 12/60 Mitchell _____ 62—217

ROBERT A. O'LEARY, *Primary Examiner.*

MEYER PERLIN, *Examiner.*

UNITED STATES PATENT OFFICE
CERTIFICATE OF CORRECTION

Patent No. 3,180,107                 April 27, 1965

Marshall W. Baker et al.

It is hereby certified that error appears in the above numbered patent requiring correction and that the said Letters Patent should read as corrected below.

Column 1, line 54, for "same" read -- name --; line 71, for "valve assembly" read -- control valve assembly or suction modulatable throttling valve assembly --; column 2, lines 49 and 50, for "expnasion" read -- expansion --; column 3, line 2, strike out "control valve assembly or suction modulatable throttling"; column 5, line 19, for "retailed" read -- retained --.

Signed and sealed this 5th day of April 1966.

(SEAL)
Attest:

ERNEST W. SWIDER
Attesting Officer

EDWARD J. BRENNER
Commissioner of Patents